(12) United States Patent
Kemppainen et al.

(10) Patent No.: US 8,146,678 B2
(45) Date of Patent: Apr. 3, 2012

(54) ROCK DRILLING APPARATUS AND METHOD FOR CONTROLLING ROCK DRILLING APPARATUS

(75) Inventors: Timo Kemppainen, Tampere (FI); Jukka Osara, Hämeenkyrö (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 12/376,528

(22) PCT Filed: Aug. 9, 2007

(86) PCT No.: PCT/FI2007/050438
§ 371 (c)(1),
(2), (4) Date: Feb. 5, 2009

(87) PCT Pub. No.: WO2008/017732
PCT Pub. Date: Feb. 14, 2008

(65) Prior Publication Data
US 2009/0321133 A1   Dec. 31, 2009

(30) Foreign Application Priority Data
Aug. 9, 2006 (FI) .................................. 20065509

(51) Int. Cl.
*E21B 44/00* (2006.01)
(52) U.S. Cl. ............... 175/24; 175/113; 175/40; 173/11
(58) Field of Classification Search ............ 175/24, 175/113, 40; 173/11
See application file for complete search history.

(56) References Cited

U.S. PATENT DOCUMENTS 4,881,227 A * 11/1989 Buhren ........................... 714/11
2004/0216922 A1   11/2004 Koivunen et al.

FOREIGN PATENT DOCUMENTS

DE   4432237 A1   12/1995
FI   115481 B   6/2003

OTHER PUBLICATIONS

International Search Report mailed Nov. 16, 2007 issued in PCT Application No. PCT/FI2007/050438.
Finland Office Action mailed Jun. 20, 2007 issued in Finland Application No. 20665509.
Martin Törngren et al., "A Distributed Computer Testbed for Real-Time Control of Machinery", In: Proc. 5th Euromicro Workshop on Real-Time Systems, Oulu, Finland, Jun. 22, 1993, pp. 162-167.

* cited by examiner

*Primary Examiner* — William P Neuder
*Assistant Examiner* — Yong-Suk Ro
(74) *Attorney, Agent, or Firm* — Morgan, Lewis & Bockius LLP

(57) ABSTRACT

A rock drilling apparatus with several actuator units, a user interface control unit, and at least one control means connected to the user interface control unit for controlling the functions of the rock drilling apparatus, and for each actuator unit, a control element connected under the control of the user interface control unit for controlling the operation of the actuator unit in accordance with control signals provided by the user interface control unit, and a method for controlling the rock drilling apparatus. When the control element of an actuator unit of the rock drilling apparatus turns faulty, the control element of another actuator unit is connected to control the first actuator unit when the other actuator unit need not be controlled.

7 Claims, 7 Drawing Sheets

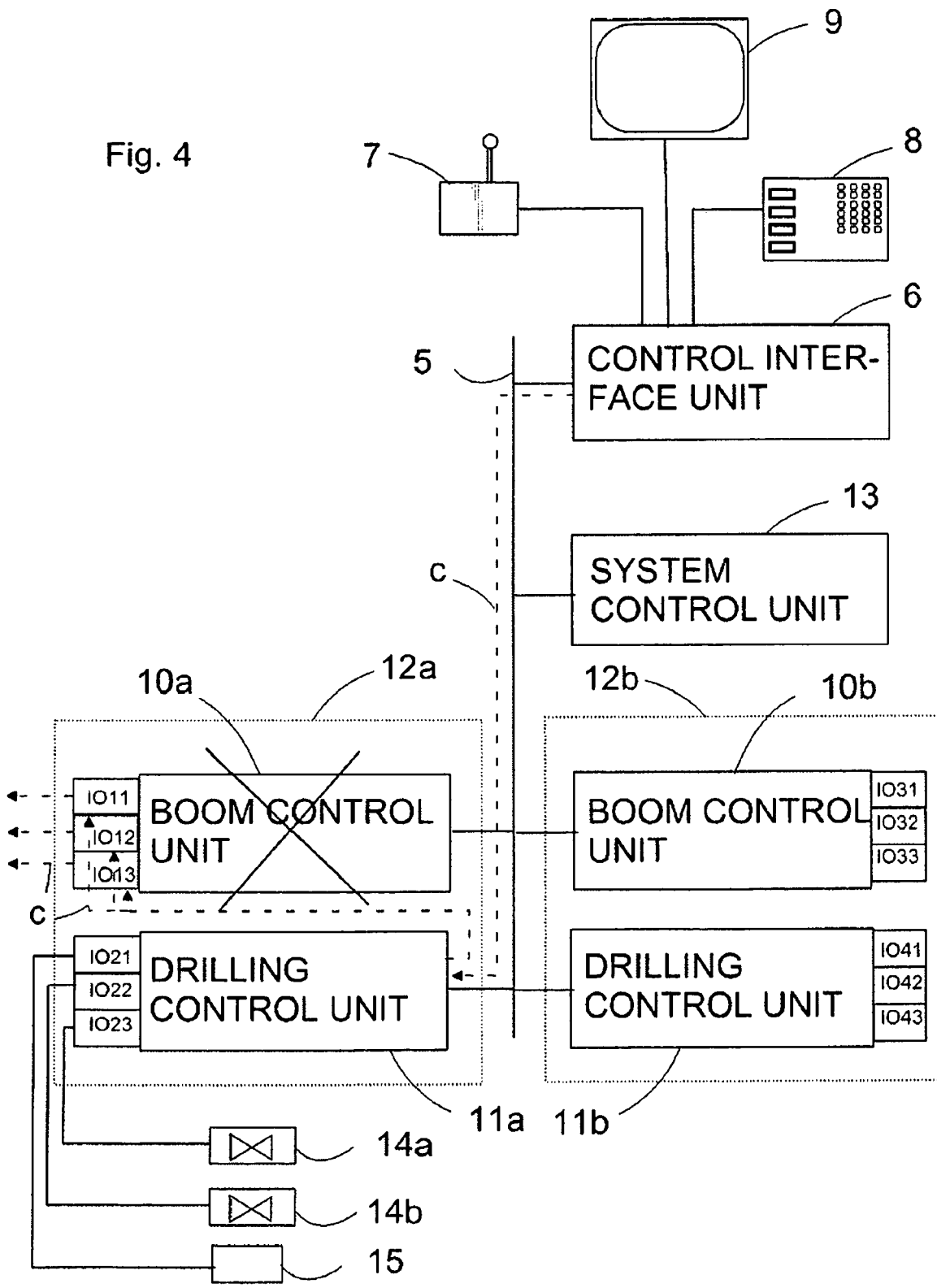

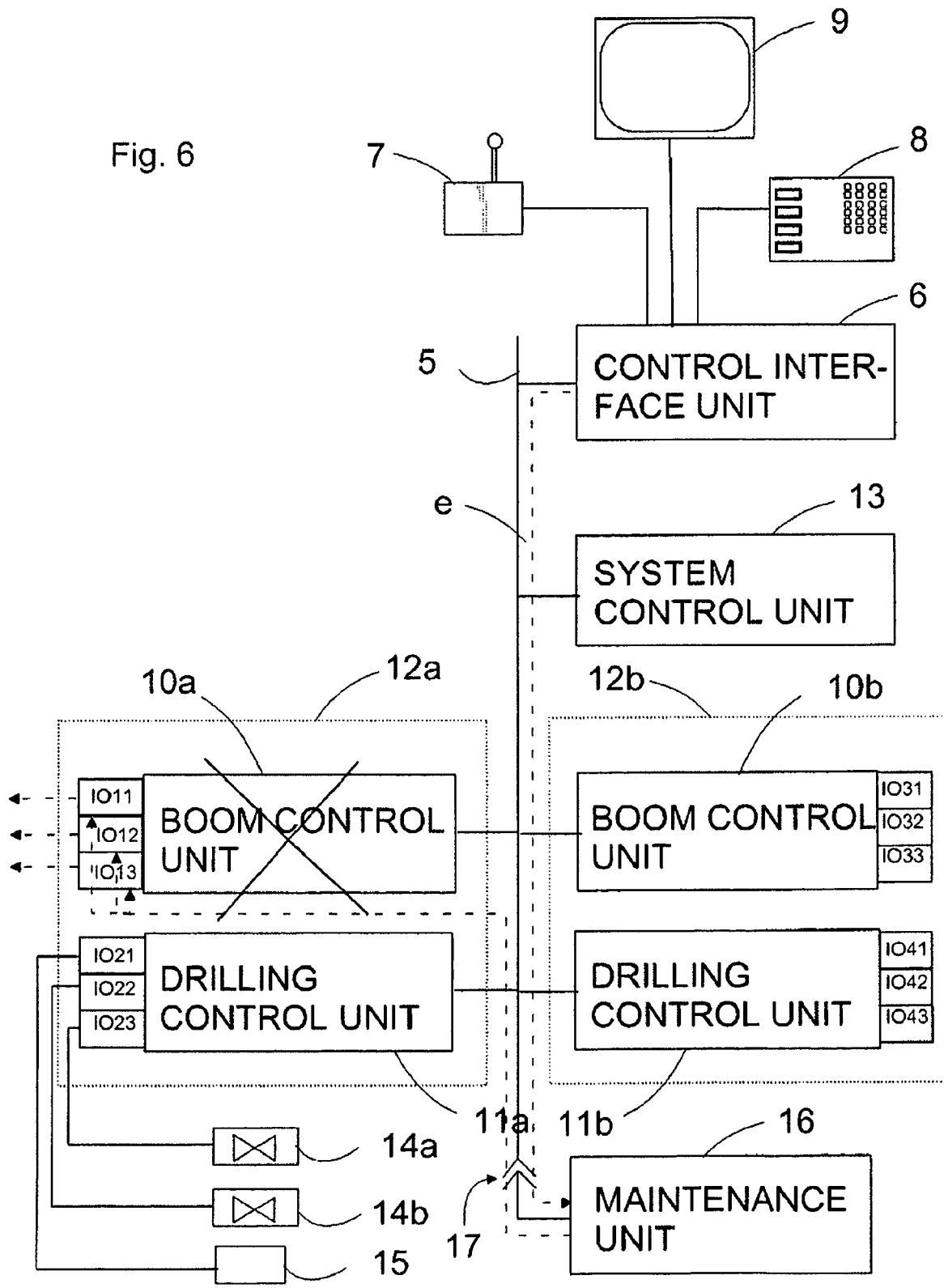

ROCK DRILLING APPARATUS AND METHOD FOR CONTROLLING ROCK DRILLING APPARATUS

CROSS REFERENCE TO RELATED APPLICATIONS

This application is a §371 National Stage Application of International Application No. PCT/FI2007/050438, filed Aug. 9, 2007, and claims priority under 35 U.S.C. §119 and/or §365 to Finnish Application No. 20065509, filed Aug. 9, 2006.

PRIOR ART

The invention relates to a rock drilling apparatus with several actuator units, a user interface control unit, and at least one control means connected to the user interface control unit for controlling the functions of the rock drilling apparatus, and for each actuator unit, a control element connected under the control of the user interface control unit for controlling the operation of the actuator unit in accordance with control signals provided by the user interface control unit. The invention further relates to a method for controlling a rock drilling apparatus that has several actuator units, a control unit, and at least one control means connected to the control unit for controlling the functions of the rock drilling apparatus, and for each actuator unit, a control element connected under the control of the control unit for controlling the operation of the actuator unit in accordance with control signals provided by the control unit.

Rock drilling apparatuses are currently controlled electronically and in most cases with some type of logic or computer control. In practice, a distributed control system is typically used and actuators, such as a rock drilling machine, boom, etc., are separate, controllable actuator units having separate control units for the control of a specific function. The systems are constructed so that each actuator or actuator entity has its own control unit and, if the rock drilling apparatus has several booms, for instance, each boom or each specific actuator unit has its own control unit.

Today, control systems also include diagnostics capable of detecting possible faults and reporting them. Thus, the control system is capable of reporting if a control unit or the IO unit of a control unit does not work. Nowadays, the faulty unit always needs to be replaced before the actuators controlled by it can be used again.

A problem with prior-art solutions is that when a fault is detected, the operation of the entire rock drilling apparatus is discontinued until the faulty unit has been repaired or replaced. This causes both expensive shutdowns and delays in work.

BRIEF DESCRIPTION OF THE INVENTION

It is an object of the present invention to provide a rock drilling apparatus and method with which it is possible to avoid or decrease problems caused by failure in control elements.

The rock drilling apparatus of the invention is characterised in that it comprises means which, when a control element of an actuator unit turns faulty, connect the control element of another actuator unit to control the first actuator unit when the other actuator unit need not be controlled.

The method of the invention is characterised in that, when a control element of an actuator unit turns faulty, said actuator unit is controlled with a control element of another actuator unit when the other actuator unit need not be controlled.

An aspect of the invention is that the operation of a faulty unit is managed with a corresponding control unit of a second, similar unit temporarily until the faulty unit has been repaired or replaced. Thus, a faulty control unit intended to control the boom, for instance, can be replaced by using the control unit of a second boom when said boom is not being controlled. This way, in a fault situation, one control unit can control several booms one at a time merely by connecting the unit alternately to control each boom as it is being directed and used. According to an embodiment of the invention, this replacement of the unit can be done merely through a user interface belonging to the control system. According to a second embodiment of the invention, the replacement can be done by using a separate maintenance unit with which the faulty control unit can be temporarily bypassed and a functioning control unit used instead. According to yet another embodiment of the invention, the control system comprises means for replacing a faulty control unit automatically or for suggesting its replacement automatically.

BRIEF DESCRIPTION OF FIGURES

The invention is described in more detail in the attached drawings, in which

FIG. 4 shows a second control coupling of the control system of FIG. 2 in a fault situation, FIG. 6 shows the control coupling of the control system of FIG. 2 in a fault situation when using a separate maintenance unit.

DETAILED DESCRIPTION OF SOME EMBODIMENTS OF THE INVENTION

Figure 1:
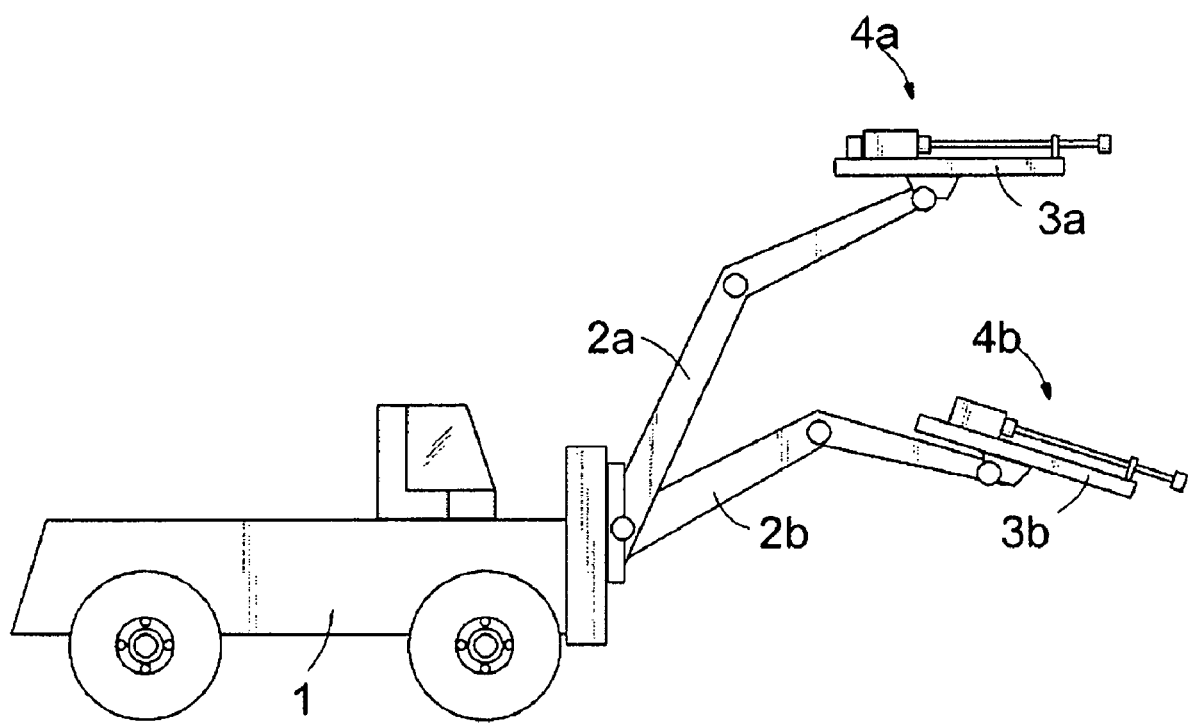
FIG. 1 is a schematic representation of a rock drilling apparatus.

FIG. 1 is a schematic representation of a rock drilling apparatus having a carrier 1 and booms 2a and 2b mounted turnably in a manner known per se to the carrier 1. The ends of the booms 2a and 2b have feed beams 3a and 3b with movable rock drilling machines 4a and 4b on them. These are generally known per se and their operation is known and obvious to a person skilled in the art, which is why it is not necessary to describe them in more detail. The booms with their actuators and the rock drilling machines with their actuators are separate actuator units. The actuator units 2a to 4b can further be not only booms, feed beams, and rock drilling machines, but also other actuators, such as power units, jacks, and user interfaces used to control the equipment.

Figure 2:
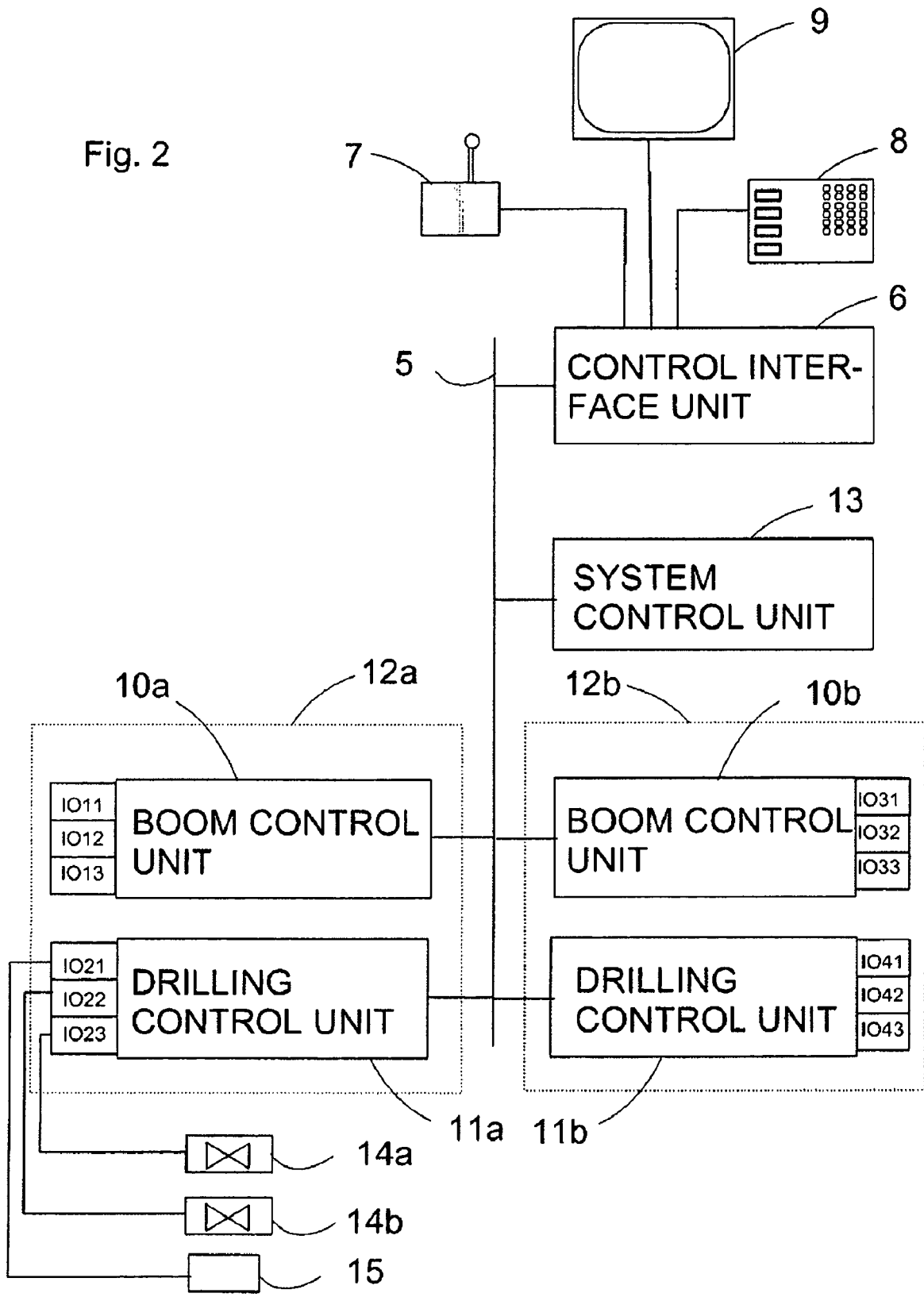
FIG. 2 is a schematic representation of a control system of the rock drilling apparatus of FIG. 1 in a block diagram.

The different components of the booms 2a and 2b, feed beams 3a, 3b, and rock drills 4a and 4b of the rock drilling apparatus shown in FIG. 1 and their position and direction relative each other are controlled in a manner known per se with control equipment, one embodiment of which is shown by way of example in more detail in FIG. 2.

FIG. 2 shows by way of example and schematically an embodiment of the control equipment of the rock drilling apparatus according to FIG. 1. The control equipment has several different control units connected to each other with a data bus 5 known per se, for instance a bus based on CAN (Controller Area Network) data bus technology.

The first control unit is a user interface control unit 6 to which different control means are connected, with which the user can enter instructions to control the operation of the control equipment. These control means may include one or more controllers 7, of which only one is shown here by way of example. The control means may further include a keyboard 8 and display 9 on which the user interface unit 6 displays the necessary information for the user.

Further, the control equipment has two boom control units 10a and 10b and two drilling control units 11a and 11b. One of the boom control units 10a or 10b and one drilling control unit 11a or 11b, respectively, form a control unit entity 12a and 12b, respectively, intended to control one drilling boom 2a or 2b, respectively, and both of them control their own actuator unit, that is, drilling boom 2a or 2b and the related second actuator unit, that is, rock drilling machine 4a or 4b. A separate system control unit 13 may also be provided to control the entire system formed by the control equipment.

Each boom control unit 10a and 10b and drilling control unit 11a and 11b, respectively, has one or more IO units according to the number of controlled actuators, and in this example, there are three for each control unit. The IO units IO11 to IO43 correspondingly control the components required for controlling their actuators, such as pressure fluid valves 14a and 14b or other components, actuators or sensors 15.

In the claims, the control units 10a, 10b, 11a, and 11b and the IO units OI11 to IO43 are commonly referred to as control elements, which thus can refer to a control unit only, an IO unit only, or both.

The control equipment functions in such a manner that the user interface control unit 6 transmits control commands as necessary to the other units through the data bus 5, and the other units then execute the commands according to the instructions defined in them. Each unit can have one or more computers for implementing control, whereby the control equipment is formed of several computers inter-connected through the data bus 5, as well as other components and IO units.

Figure 3A:
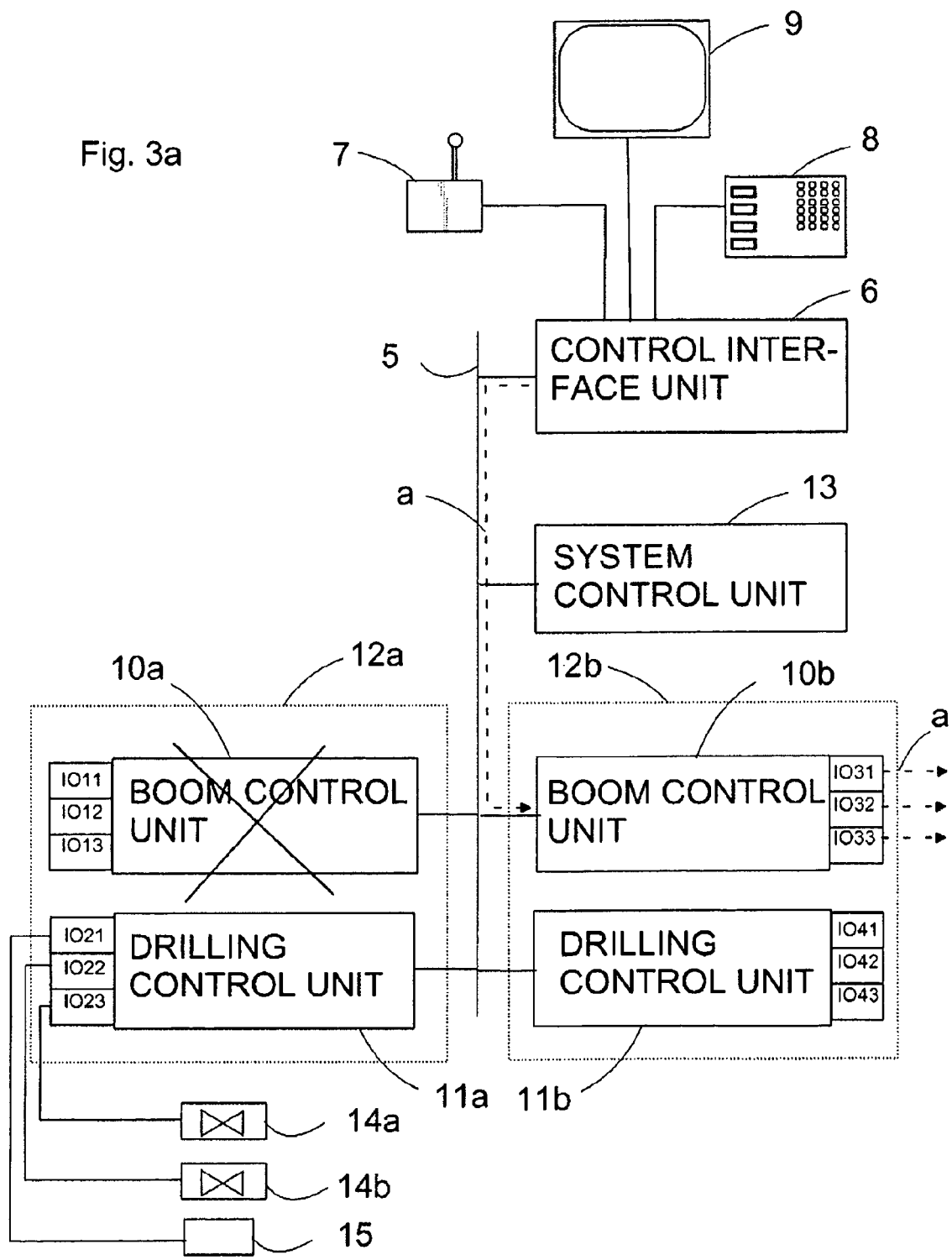
FIGS. 3a and 3b show a control coupling of the control system of FIG. 2 in a fault situation.
Figure 3B:
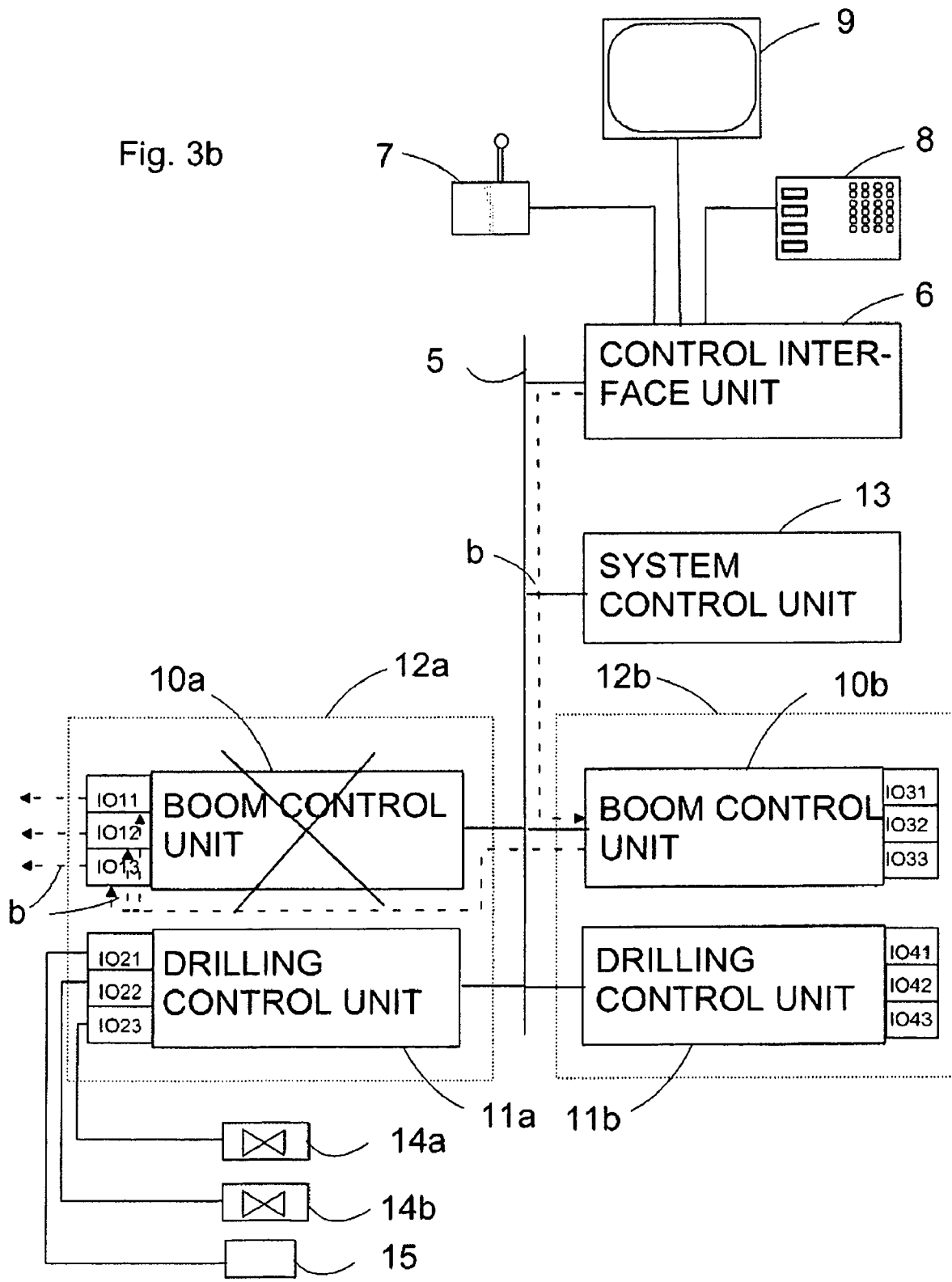

FIG. 3a shows a situation, in which the boom control unit 10a controlling the boom 2a is faulty. This is indicated by a cross drawn on the boom control unit 10a. In this situation, the boom 2b is naturally controlled as usual with the boom control unit 10b, until the boom is positioned as desired and can be stopped and left there without disturbing other operations. This is indicated schematically with dashed line arrows a. After this, in the manner shown in FIG. 3b, the boom control unit 10b is connected to control the boom 2a, whereby the boom 2a can be moved to the desired position in spite of the faulty boom control unit 10a. This is indicated schematically with dashed line arrows b. When the boom 2a is controlled to a desired position, the boom control unit 10b can again be connected to control boom 2b.

FIG. 4 shows a situation corresponding to that of FIG. 3a, in which the boom control unit 10a is faulty. This alternative embodiment uses the drilling control unit 11a of the same boom 2a to control the boom 2a until it has been positioned correctly for operation and can be stopped. This is indicated schematically with dashed line arrows c. After this, the drilling control unit 11a is connected to control drilling as usual. The drilling control unit 11a is used, when moving the boom 2a again to a new drilling location after drilling the bore.

Figure 5:
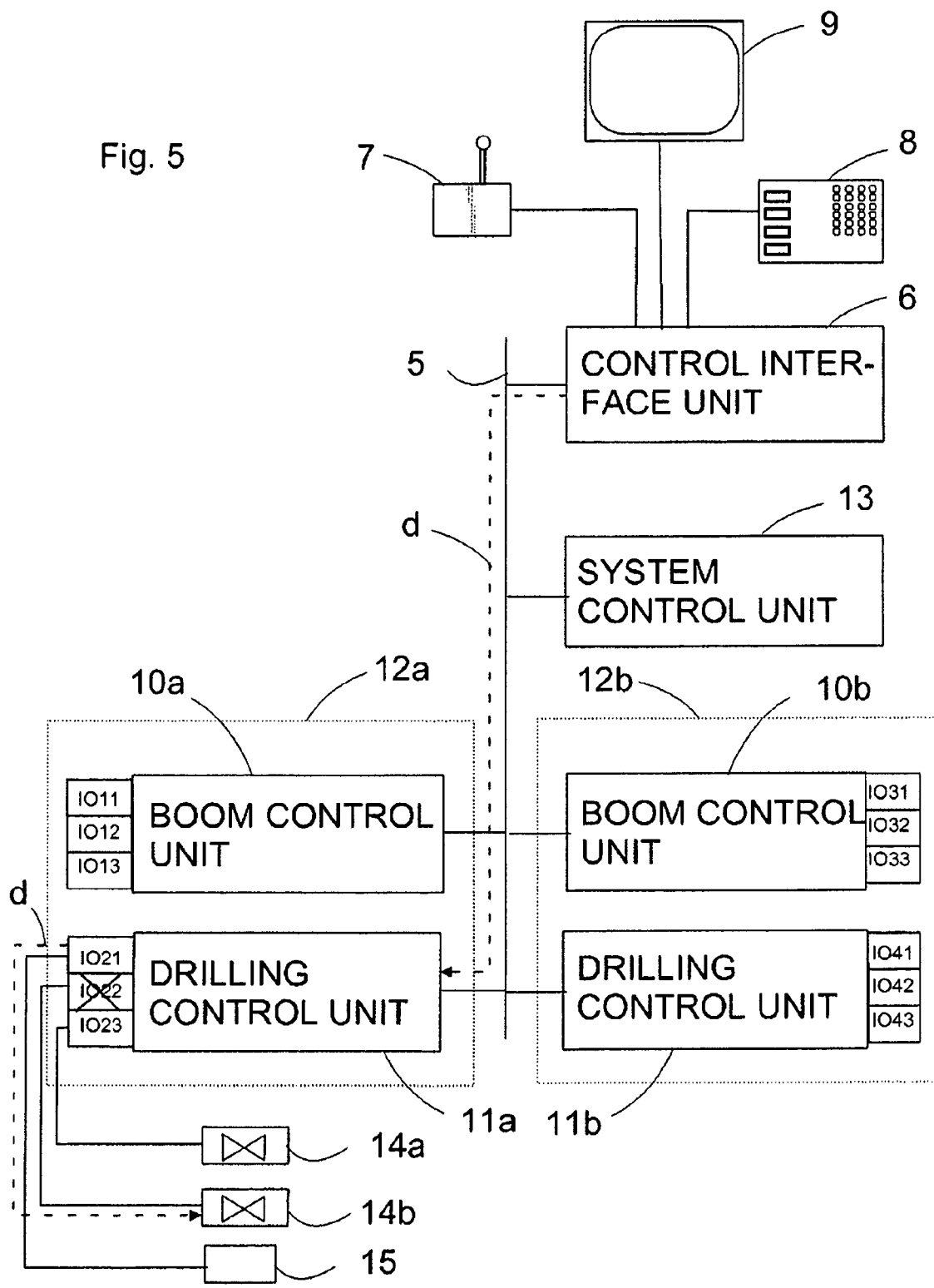
FIG. 5 shows the control coupling of the control system of FIG. 2 in another type of fault situation.

FIG. 5 shows a situation in which the IO unit IO22 of the drilling control unit 11a is faulty and cannot control the actuator valve 14b. Instead of IO unit IO22, the IO unit IO21 belonging to the drilling control unit 11a can then be used to control the actuator valve 14b when it is not needed to control its own actuator. FIG. 5 shows a situation in which this control is done to enable the use do the drilling control unit 11a. Dashed line d indicates schematically the control coupling.

FIG. 6 shows a situation corresponding to that of FIG. 3a, in which the boom control unit 10a is faulty. This alternative embodiment uses a separate maintenance unit 16 to control the boom 2a, the maintenance unit 16 being connected through a separate connection 17, for instance, to the data bus 5. It then replaces the faulty boom control unit 10a, and it is not necessary to use the control units of the other actuators. The route of the control signal is indicated schematically with dashed line arrows e.

In the solution described above by means of drawings, the implementation is based on the fact that in distributed units, the actuators are controlled through different generally defined buses. Thus, the control of the control units and IO units required by each actuator is based on unit-specific addresses and on executing commands given specifically for each unit by means of these addresses.

In the above descriptions and drawings, the invention is described by way of example only, and it is in no way restricted thereto. The essential in the invention is that a faulty control unit or IO unit of an actuator in a rock drilling apparatus can be temporarily replaced with another control unit or IO unit and the use of the apparatus can thus be continued until the faulty unit is repaired or replaced by a new one.

The invention claimed is:

1. A rock drilling apparatus comprising:
several actuator units, a user interface control unit, and at least one control means connected to the user interface control unit for controlling functions of the rock drilling apparatus, and for each said actuator unit, a control element connected under the control of the user interface control unit for controlling an operation of the actuator unit in accordance with control signals provided by the user interface control unit, and means for connecting the control element of a first actuator unit to a second actuator unit to control the second actuator when a control element of the second actuator unit turns faulty, wherein the control elements are control units that are programmed to control certain actuator units, and wherein a faulty control unit is replaced temporarily by a control unit programmed to control a similar actuator unit.

2. A rock drilling apparatus as claimed in claim 1, wherein the means for connecting the control element of the first actuator unit to control the second actuator unit is part of a computer program associated with an operating system of the control means.

3. A rock drilling apparatus as claimed in claim 1, wherein the means for connecting the control element of the first actuator unit to control the second actuator unit comprises a separate maintenance unit connectable to the control means.

4. A rock drilling apparatus as claimed in claim 1, wherein at least one of the control elements is an IO unit associated with the control unit.

5. A method for controlling a rock drilling apparatus with several actuator units, a control unit, and at least one control means connected to the control unit for controlling functions of the rock drilling apparatus, and for each actuator unit, a control element connected under the control of the control unit for controlling an operation of the actuator unit in accordance with control signals provided by the control unit, the method comprising, when a control element of a first actuator unit turns faulty, controlling said first actuator unit with a control element of a second actuator unit when the second actuator unit need not be controlled, wherein when the control elements are control units programmed to control certain actuator units, a control unit programmed to control a similar actuator unit is used to replace temporarily a faulty control unit.

6. A method as claimed in claim 5, wherein said connection of the control element of the second actuator unit to control the control element of the first actuator unit is done with a computer program associated with an operating system of the control means.

7. A method as claimed in claim 5, wherein said connection of the control element of the second actuator unit to control the control element of the first actuator unit is done with a separate maintenance unit connected to the control means.

* * * * *